United States Patent [19]
Baumgarten

[11] Patent Number: 5,940,229
[45] Date of Patent: Aug. 17, 1999

[54] IMAGE REFLECTING DEVICE FOR USE WITH A COMPUTER MONITOR

[75] Inventor: David Baumgarten, 3740 25th St. #102, San Francisco, Calif. 94110

[73] Assignee: David Baumgarten, Atlanta, Ga.

[21] Appl. No.: 08/622,727

[22] Filed: Mar. 26, 1996

[51] Int. Cl.[6] .............................. G02B 5/08; G02B 5/10; H04N 7/14
[52] U.S. Cl. .......................... 359/839; 359/864; 348/15
[58] Field of Search ................... 359/839, 854, 359/855, 864, 865, 866; 248/467; 348/13, 15

[56] References Cited

U.S. PATENT DOCUMENTS

| | | | |
|---|---|---|---|
| D. 345,655 | 4/1994 | Freebairn | D6/312 |
| 2,605,676 | 8/1952 | Couch | 359/854 |
| 3,187,629 | 6/1965 | Rowell | 88/90 |
| 4,771,300 | 9/1988 | Bryan | 354/81 |
| 4,821,307 | 4/1989 | Flint, III | 379/53 |
| 4,848,542 | 7/1989 | Burnette et al. | 206/45.14 |
| 4,856,888 | 8/1989 | Wahl | 359/881 |
| 4,863,254 | 9/1989 | Dyer | 350/631 |
| 5,130,856 | 7/1992 | Tichenor et al. | 359/857 |
| 5,136,434 | 8/1992 | Katz | 359/862 |
| 5,200,859 | 4/1993 | Payner et al. | 359/857 |
| 5,280,386 | 1/1994 | Johnson | 359/509 |
| 5,313,337 | 5/1994 | Byers | 359/872 |
| 5,430,578 | 7/1995 | Reagan | 359/855 |
| 5,576,687 | 11/1996 | Blank et al. | 340/438 |
| 5,634,201 | 5/1997 | Mooring | 455/90 |
| 5,742,442 | 4/1998 | Allsup et al. | 359/839 |
| 5,771,436 | 6/1998 | Ikehama | 455/12.1 |

*Primary Examiner*—Cassandra Spyrou
*Assistant Examiner*—Mark A. Robinson
*Attorney, Agent, or Firm*—Phillip H. Albert; Townsend and Townsend and Crew

[57] ABSTRACT

A device and method for generating images of a computer user and the surrounding area behind the user. A mirror (24) has a reflecting surface (32) and a support (22) supports the mirror adjacent to or on a computer monitor (6). The mirror is positioned relative to the computer monitor so that the reflecting surface reflects an image of an area in front of the screen display towards the eyes of the user. In this manner, the computer user can monitor the surrounding area to ensure that confidential or personal information on the computer monitor is not seen by others. In addition, the user can inspect his or her own appearance prior to or during video communication with remote users.

9 Claims, 4 Drawing Sheets

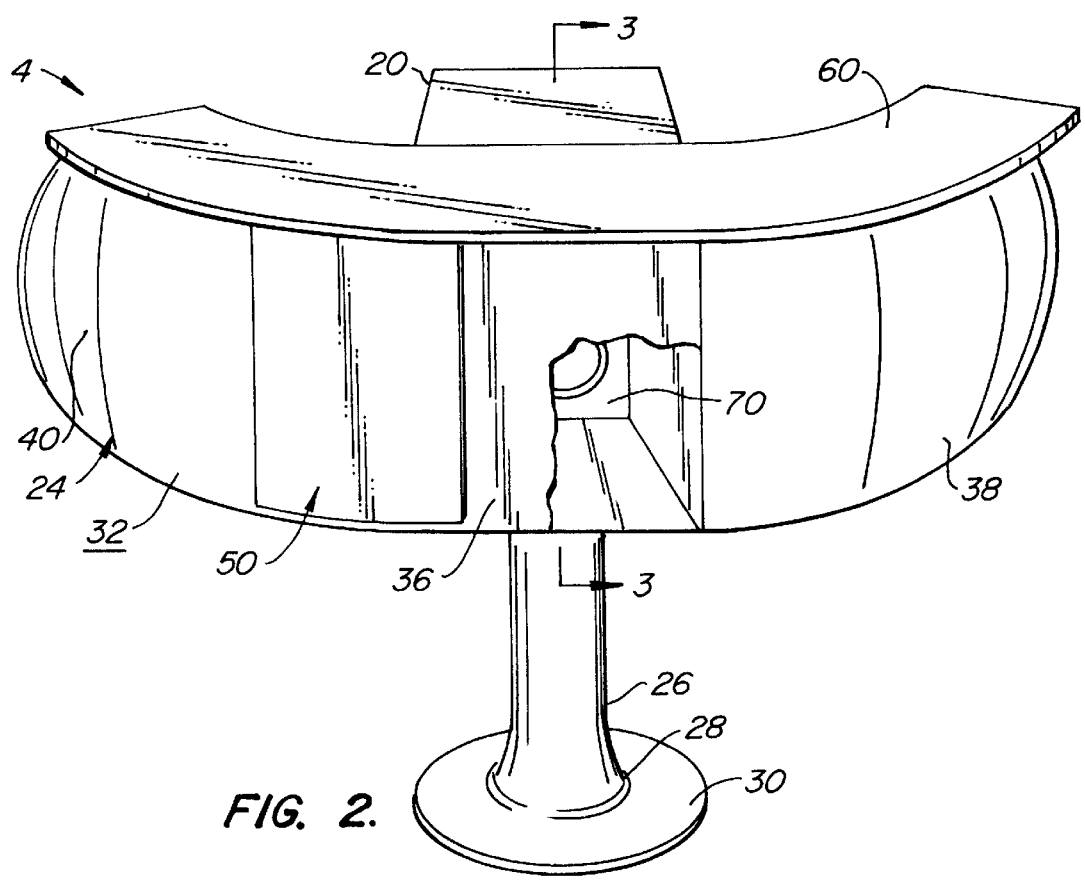
FIG. 2.
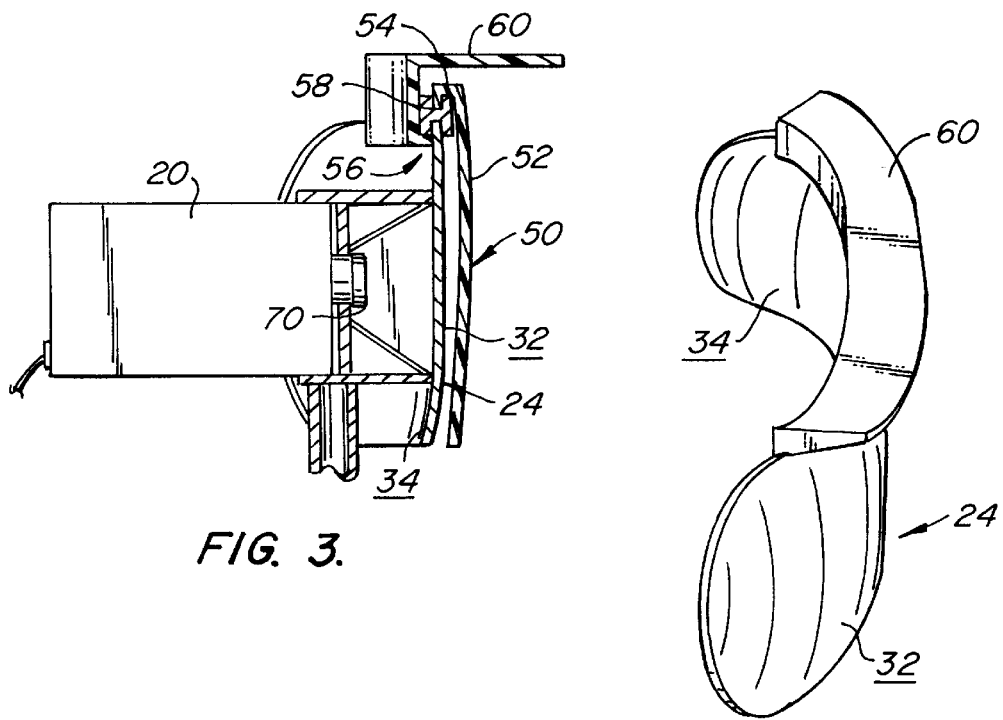
FIG. 3.
FIG. 4.

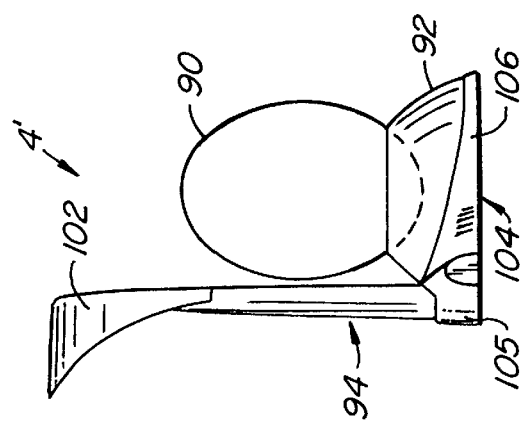
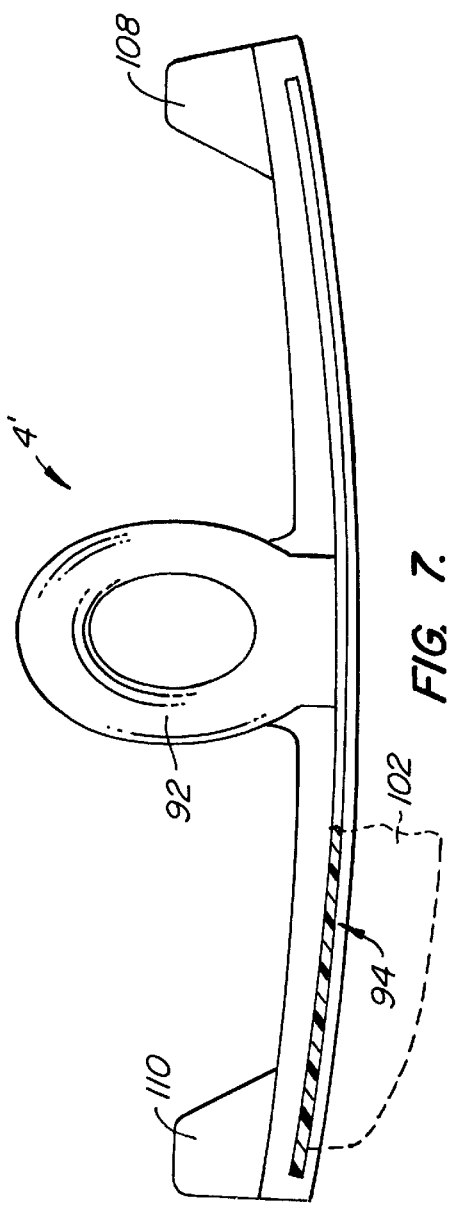
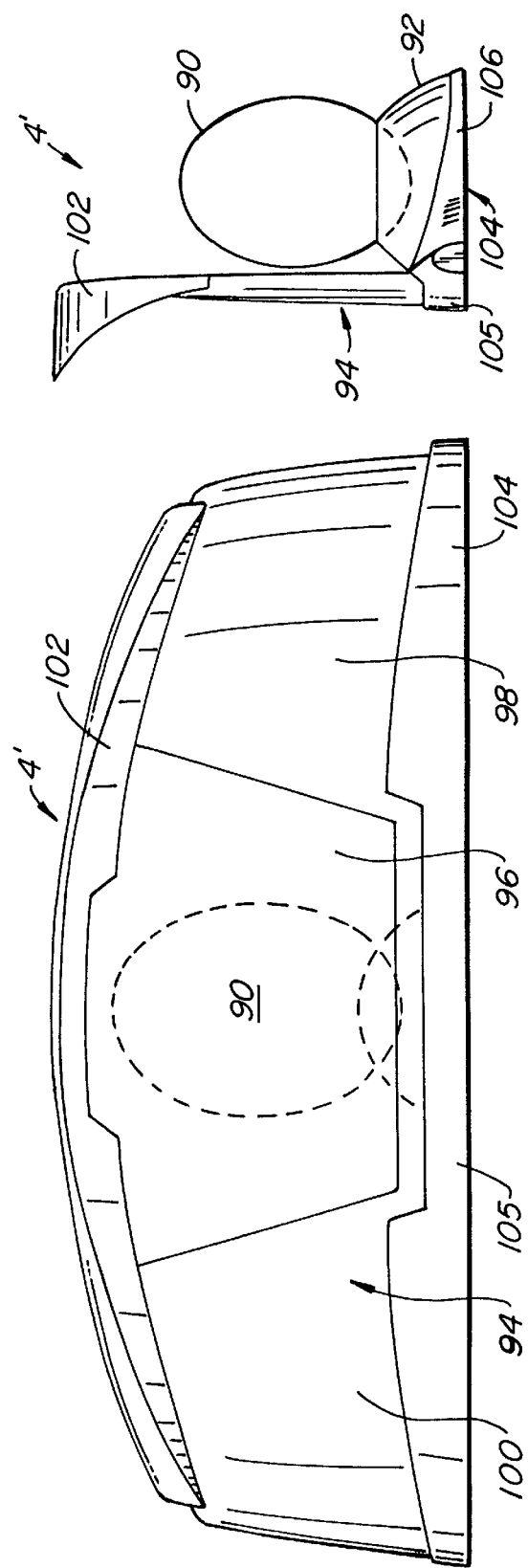

IMAGE REFLECTING DEVICE FOR USE WITH A COMPUTER MONITOR

BACKGROUND OF THE INVENTION

The present invention relates generally to computers and more particularly to computer monitors incorporating a mirror for reflecting an image of the computer user and/or the surrounding area behind the user.

The rapid advances in computer technology in recent years has generated a variety of new opportunities and challenges. For example, the recent advent of the information superhighway (i.e., the Internet and the World Wide Web) has created new forms of communication between computer users that are located at remote locations from each other; for example, electronic mail and computer videoconferencing. Computer videoconferences are typically carried out with a viewing apparatus, such as a video camera, mounted near the computer terminal and directed at the user as the user faces the computer monitor. The video camera records images of the user and transmits these images almost simultaneously to the remote user, who typically views the image on his or her computer monitor.

Unlike conventional modes of communication, such as the telephone or electronic mail, the user's appearance will be displayed to other users during a videoconference. Many individuals may find this somewhat intimidating, particularly if the user does not have time to check their appearance prior to turning on the camera. It would, therefore, be desirable if computer users could quickly and relatively easily inspect their appearance (from the eyes of the camera) prior to or during the transmission of this appearance to the remote user.

Another challenge that has been presented by recent changes in computer technology is the security of data. Computers are used extensively in the workplace in association with many tasks, such as accounting, word processing, storing information and the like. Often, these tasks will involve storing and/or transmitting personal or confidential information. To protect this type of information, software methods, such as encryption techniques, have been developed to secure data stored in the computer's memory and/or transmitted to other computers via electronic mail or the like. Screen savers have also been developed to prevent others from viewing information on the computer screen while the user is away from his/her desk.

Despite the recent efforts to secure confidential information on computers, users still face potentially compromising situations during the inputting, storage and/or transmission of data. For example, one such situation is when a computer user is actually sitting at his or her desk inputting confidential or personal information onto the computer screen. Typically, the user directly faces the computer monitor with his or her back to the door or window of the office/carrel. As the user is often concentrating on the task at hand, he or she may not notice individuals passing by or standing in the doorway and glancing at the confidential information on the screen display.

Accordingly, a device and method is needed for notifying computer users when other people are within viewing distance of their computer monitor. In particular, it would be desirable if users could monitor the surrounding area behind them without turning their head away from the computer monitor.

SUMMARY OF THE INVENTION

The present invention provides a device and method for generating images of a computer user and the surrounding area behind the user and for transmitting these images to the user. In this manner, computer users can quickly and easily inspect their own appearance prior to or during video communication with remote users. In addition, users may monitor the surrounding area behind them to ensure that confidential or personal information on the computer monitor is not viewed by others.

The viewing device of the present invention comprises a mirror having a reflecting surface and a support for supporting the mirror adjacent to or on the computer monitor. The mirror is positioned relative to the computer monitor so that the reflecting surface reflects an image of an area in front of the screen display towards the eyes of the user. The image may include the user, the region behind the user as the user is facing the screen display, or both. Preferably, the reflecting surface will include a central reflecting portion for reflecting an image of the user and one or more side reflecting portions for reflecting an image of the region behind and around the user. In this manner, computer users may inspect their own appearance during computer use, and they may monitor the region behind themselves for security purposes.

In one aspect, the invention further includes a viewing apparatus, such as a video camera, operatively positioned relative to the computer to record and reproduce video images of the user as the user operates the computer (i.e., for a videoconference or other purposes). The images recorded by the video camera will be substantially the same as the image reflected by the mirror so that users will be able to monitor the view of themselves from the eyes of the camera. Preferably, a portion of the mirror is a one-way mirror that allows light to pass through one direction and reflects light in the other direction. The video camera is mounted to the mirror behind the one-way portion so as to view the user through this portion of the mirror. This hides the video camera from view and also effectively ensures that the images recorded by the camera will substantially match the image reflected by the mirror to the user. Alternatively, the mirror may have a hole in the central portion for allowing the video camera to project directly through the hole to the user.

In a specific configuration, the mirror is pivotally mounted to an upright stand on top of the computer monitor. The mirror includes a central, planar reflecting portion for minimizing distortion of the user's image and first and second convex side mirrors on either side of the central mirror for reflecting an image of the region behind the user. The central planar portion of the mirror is a one-way mirror and includes an attachment for receiving the video camera. The convex side mirrors are curved vertically and horizontally away from the user to increase the area of the region in the mirrors' reflection. In a particularly advantageous embodiment, the amount of horizontal curvature of the side mirrors can be varied to control the amount of peripheral view obtained by the user.

The above is a brief description of some deficiencies in the prior art and advantages of the present invention. Other features, advantages and embodiments of the invention will be apparent to those skilled in the art from the following description, accompanying drawings and appended claims.

BRIEF DESCRIPTION OF THE DRAWINGS

FIG. 2 is a front perspective view of the image generating device of FIG. 1;

FIG. 3 is a side partial cross-sectional view of the image generating device of FIG. 1;

FIG. 4 is a perspective view of a mirror of the image generating device of FIG. 1;

FIGS. 6–8 are front, top and side views, respectively, of another alternative embodiment of the image generating device of FIG. 1.

DESCRIPTION OF THE PREFERRED EMBODIMENT

Figure 1:
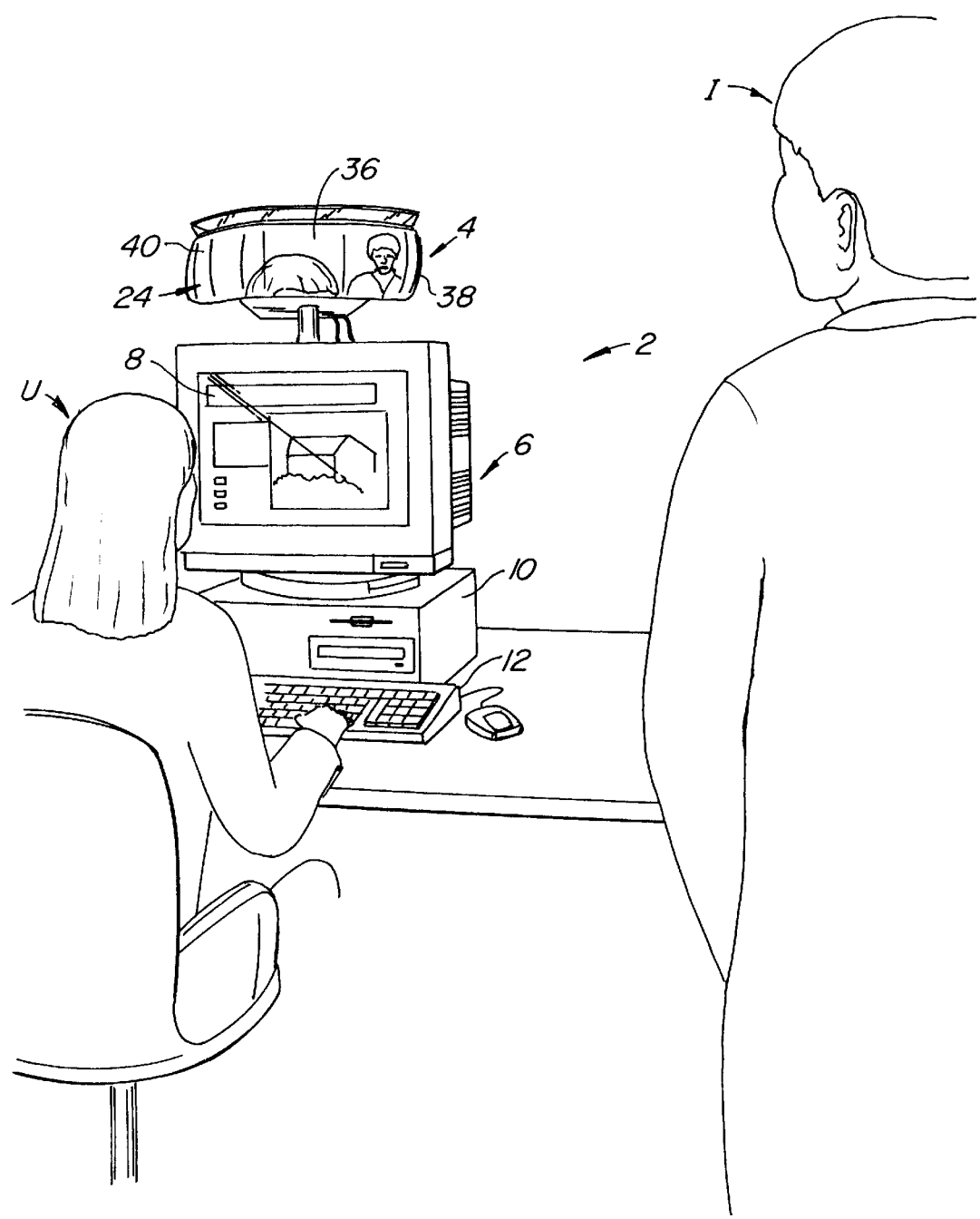
FIG. 1 is a schematic view of a computer user operating a representative computer system incorporating an image generating device in accordance with the principles of the present invention.

Referring to the drawings in detail, wherein like numerals indicate like elements, a representative computer system 2 incorporating an image generating device 4 is illustrated according to the principles of the present invention. As shown in FIG. 1, device 4 is supported on a computer monitor 6 incorporating a screen display 8. The computer system 2 will typically include a central processing unit 10, a keyboard 12 and other peripheral equipment (not shown), as is conventional in the art. As discussed in further detail below, image generating device 4 produces an image of the user U and the region behind and/or around the user U so that the he or she can monitor an individual I who may be glancing at the information on screen display 8.

Referring to FIGS. 2–4, image generating device 4 comprises a base housing 20 mounted on a support 22 and a mirror 24 attached to one side of base housing 20. Support 22 includes an upright member 26 joined at its bottom end 28 into a generally horizontal base member 30. Base member 30 is preferably in the shape of a relatively thin flat plate for resting on a substantially planar surface, such as a desktop or a top surface of computer monitor 6. Base member 30 can also be mounted to a planar or non-planar surface by suitable fasteners, such as Velcro™, clamps, screws, rivets, double stick tape or the like. Housing 20 is preferably pivotally mounted to upright member 26 (via, e.g., a swivel joint (not shown)) around both the longitudinal axis of the upright member 26 and around an axis perpendicular to member 26. This permits the user to pivot housing 20 and mirror 24 up and down and from side to side to change the viewing angle of the image reflected by mirror 24. In this manner, the device will accommodate a variety of users' sitting positions and heights and will allow the user to change the image reflected by mirror 24. Additionally or alternatively, upright member 26 may include extensions for adjusting the vertical distance between mirror 24 and the planar support surface.

It should be noted that the means for supporting mirror 24 is not limited to the upright member 26 described above and illustrated in the figures. For example, mirror 24 may be directly coupled to the top surface of the computer monitor or desk with suitable fasteners (i.e., without upright member 26). Alternatively, mirror 24 may be mounted to a wall behind the computer monitor.

Referring to FIGS. 2 and 4, mirror 24 includes a reflecting surface 32 and an opposite non-reflecting surface 34 mounted to housing 20. Mirror 24 preferably includes a central reflecting portion 36 and two side reflecting portions 38, 40 on either side of portion 36. As shown in FIG. 1, central portion 36 is preferably configured to reflect an image of the computer user and, therefore, is substantially planar to minimize distortion of the image reflected therefrom. It is envisioned that mirror will typically be positioned about 6 to 24 inches from the user and, therefore, will usually have a surface area of about 9 to 400 square inches to provide a suitable image of the user's head. Of course, it should be recognized that planar portion 36 can be configured to reflect a larger portion of the user, such as the head and shoulders or the entire upper body, if desired.

As shown in FIG. 1, the side portions 38, 40 are preferably configured to reflect an image of the region behind and around the computer user. To increase the area of this region, side portions 38, 40 are horizontally and vertically convex, so that their reflecting surfaces curve away from the user in both the horizontal and vertical directions. As discussed below, this allows the computer user to monitor a relatively large peripheral area behind him or her. Side portions 38, 40 will preferably have a larger horizontal dimension than a vertical dimension to provide a greater peripheral view for the user. The exact dimensions of the side mirrors will, of course, vary depending upon the dimensions of the user's office, carrel, etc. In a representative embodiment, the entire mirror will have a width of about 10–15 inches and a height of about 2–5 inches. These dimensions will also vary depending upon where the mirror is mounted, i.e., on top of the computer, on a desktop or to an office wall.

In a preferred configuration, the amount of horizontal curvature of side portions 38, 40 can be varied to control the degree of distortion, thereby controlling the degree of peripheral view obtained by the user. To that end, side portions 38, 40 preferably comprise a flexible material, such as clear plastic, that can be deflected to vary the horizontal curvature of portions 38, 40. Alternatively, the invention may include a conventional or specialized mechanical or electrical actuator, such as a worm gear driven by a reversible DC motor, for deflecting side portions 38, 40.

Referring again to FIG. 3, image generating device 4 further includes a cover 50 for blocking portions of reflecting surface 32. In a preferred configuration, cover 50 is a rigid sheet 52 having an upper portion 54 that bends around for snapping cover 50 onto an upper edge 56 of mirror 24. Mirror 24 includes a track 58 for receiving the bent upper portion 54 of cover 50 and for allowing cover 50 to be translated along upper edge 56 of mirror 24 to vary the sections of the image that are blocked by cover 50. For example, the user may wish to block the image of himself or his assistant or, during a videoconference, the user may wish to block certain portions of his or her office.

As shown in FIG. 4, image generating device 4 further includes a visor 60 extending along upper edge 56 of mirror 24 to reduce glare or other bright reflections on reflecting surface 32. In addition, reflecting surface 32 may have a non-glare coating for reducing bright reflections or glare to thereby reduce distractions to the user.

In a specific embodiment of the invention, a video camera 70 is disposed within housing 20 so that camera 70 is directed at the computer user through planar portion 36 of mirror 24. In this configuration, mirror 24 is a one-way mirror that allows camera 70 to view the user through mirror 24, while blocking view of the camera 70 from the other direction. The video camera 70 records and transmits video images of the user that are substantially similar to the image reflected from reflecting surface 32. Therefore, users can monitor themselves prior to or during a videoconference, or for other purposes.

It should be understood that the present invention is not limited to the above-described means for mounting a video camera 70 to the back of mirror 24. For example, video camera 70 need not be contained within a housing. In fact, the video camera could simply be positioned on a support (not shown) behind mirror 24 so that the camera is directed through planar portion 36. In this configuration, the video camera would not be connected to the mirror at all. Alternatively, non-reflecting surface 34 of mirror 24 may include an attachment (not shown) for directly attaching a video camera to the back of mirror 24. For example, the attachment could be specialized for use with certain cameras, such as those having a thread in front of the lens or a spherical video camera mounted onto a pyramidal support member, such as the video camera known as Quick Cam® produced by Connectix. In the latter configuration, mirror 24 would include a cup-like or finger-like attachment that surrounds the spherical camera to hold the camera 70 to non-reflective surface 34 of mirror 24.

In use, base member 30 of viewing device 4 is mounted onto the top surface of computer monitor 6 or the desktop or other convenient surface around the user. As the user works on the computer, he or she can easily look up to view him or herself on planar portion 36 of mirror 24. In addition, the user may view the surrounding area behind him or her by looking at the image reflected on convex side portions 38, 40 of mirror 24, as shown in FIG. 1. Thus, if an individual I is standing behind the user and viewing the computer monitor 6, the user can easily view the individual and remove any confidential information from the screen.

To videoconference with other computer users, the computer will typically comprise a videocard or the like that is hooked to videocamera 70 behind mirror 24, as is well known in the art. Prior to initiating the conference, the user can view the image reflected from planar portion 36 of mirror 24 to thereby see the image of him or herself that will be transmitted to the remote user during the videoconference.

FIGS. 6–8 illustrate an alternative embodiment of image generating device 4' incorporating a spherical video camera 90 mounted on a camera mount 92, such as the Quick Cam® from Connectix. Camera 90 is typically secured to mount 92 with Velcro™, a suction cup, double stick tape or the like. As shown, device 4' comprises a mirror 94 having a central planar portion 96 in front of camera 90 and curved side portions 98, 100 on either side of portion 96. Similar to the above embodiment, central portion 96 is preferably a one-way mirror for reflecting light towards the user and allowing camera 90 to shoot through portion 96. Device 4' also includes a visor 102 press fit onto the top of mirror 94 for reflecting glare or other bright reflections.

As shown in FIG. 8, device 4' includes a support 104 for mounting mirror 94 and camera 90 onto a planar surface, such as a computer monitor, desktop or the like. Support 104 includes an elongate member 105 coupled to the bottom edge of mirror 94 and a rear support member 106 extending behind elongate member 105 for securing camera mount 92 and camera 90 to a suitable position behind central portion 96 of mirror 94. Rear support member 106 may include means (not shown) for sliding camera mount 92 and camera 90 relative to mirror 94 to adjust the horizontal curvature of mirror 94. As shown in FIG. 7, support 104 further includes a pair of tabs 108, 110 on either end of member 105 for adhering support 104 to the planar surface. An adhesive (not shown), such as double stick tape, is preferably applied to the lower surface of tabs 106, 108 to stick tabs 106, 108 to the planar surface.

Figure 5:
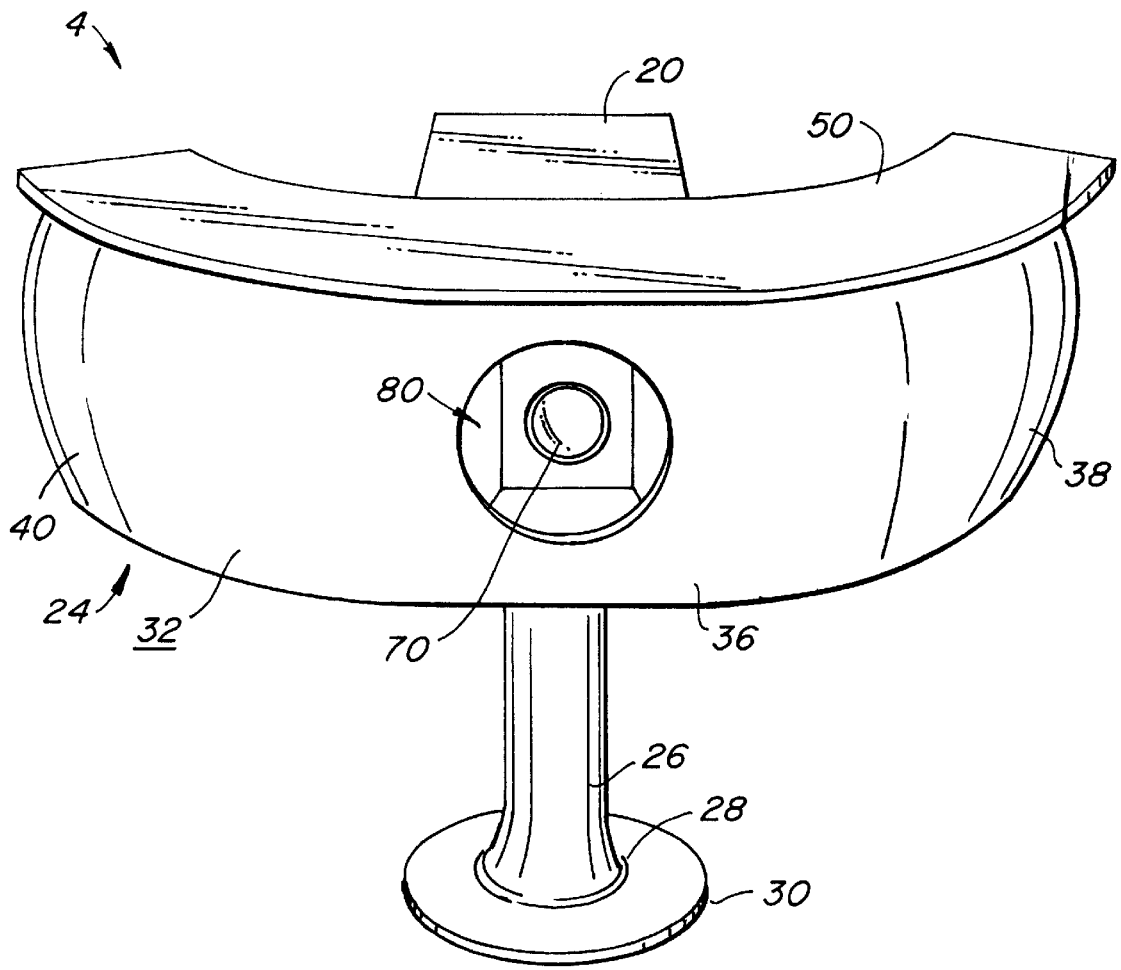
FIG. 5 is a front perspective view of an alternative embodiment of the image generating device of FIG. 1.

While the above is a full description of the specific embodiments, various modifications, alternative constructions and equivalents may be used. For example, FIG. 5 illustrates an alternative embodiment in which planar portion 36 of mirror 24 defines a hole 80 for allowing videocamera 70 to shoot directly through hole 80 to the user. This configuration provides more light to videocamera 70, thereby increasing the clarity of the video signal. In this embodiment, mirror 24 may be configured such that an image of the user is reflected from one of the side portions 38, 40 or from the central portion surrounding hole 80. Alternatively, cover 50 may have a mirror coating (not shown) so that the user can slide the cover over hole 80 to view the image of him or herself. During the videoconference, the user will slide the cover 50 away from hole 80 to expose videocamera 70.

In addition, the invention may incorporate other means for increasing the security of the data on display screen 8. For example, a substantially transparent screen (not shown) can be placed over display screen 8 and adapted allow view of the screen from certain angles, while preventing view of the screen from other angles. In this manner, the screen can be configured so that only the user can view display screen 8. Alternatively, computer system 2 may incorporate an infra-red sensing system that detects individuals within a certain area of the computer system (i.e., within viewing distance of the display screen) and automatically dims the display screen until the individuals leave the area.

What is claimed is:

1. A viewing device for use with a desktop computer monitor having a screen display comprising:

a reflecting surface comprising at least one convex reflecting portion and a plane reflecting portion, the plane reflecting portion including a one-way mirror portion, wherein the horizontal curvature of the convex reflecting portion is adjustable;

a support for supporting the reflecting surface above the desktop computer monitor, the reflecting surface being positioned relative to the desktop computer monitor to reflect an image of an area in front of the screen display toward the eyes of a user; and means for attaching a camera to the support to capture images received through the one-way mirror portion.

2. The device of claim 1 wherein the image includes the user.

3. The device of claim 1 wherein the image includes a region behind the user as the user is facing the screen display.

4. The device of claim 1 wherein the reflecting surface has a plane reflecting portion for reflecting an image of the user and a convex reflecting portion for reflecting an image of a region behind the user.

5. The device of claim 4 wherein the convex reflecting portion comprises first and second side mirrors disposed on either side of the plane reflecting portion.

6. The device of claim 5 wherein the side mirrors have horizontal and vertical curvatures.

7. The device of claim 1 wherein the reflecting surface has a length in the horizontal direction greater than a length in the vertical direction.

8. The device of claim 1 wherein the support comprises one or more upright members for supporting the reflecting surface on a top surface of the desktop computer monitor.

9. The device of claim 1 further comprising a cover removably coupled to the reflecting surface for shielding a portion of the reflecting surface from the user.

* * * * *